UNITED STATES PATENT OFFICE.

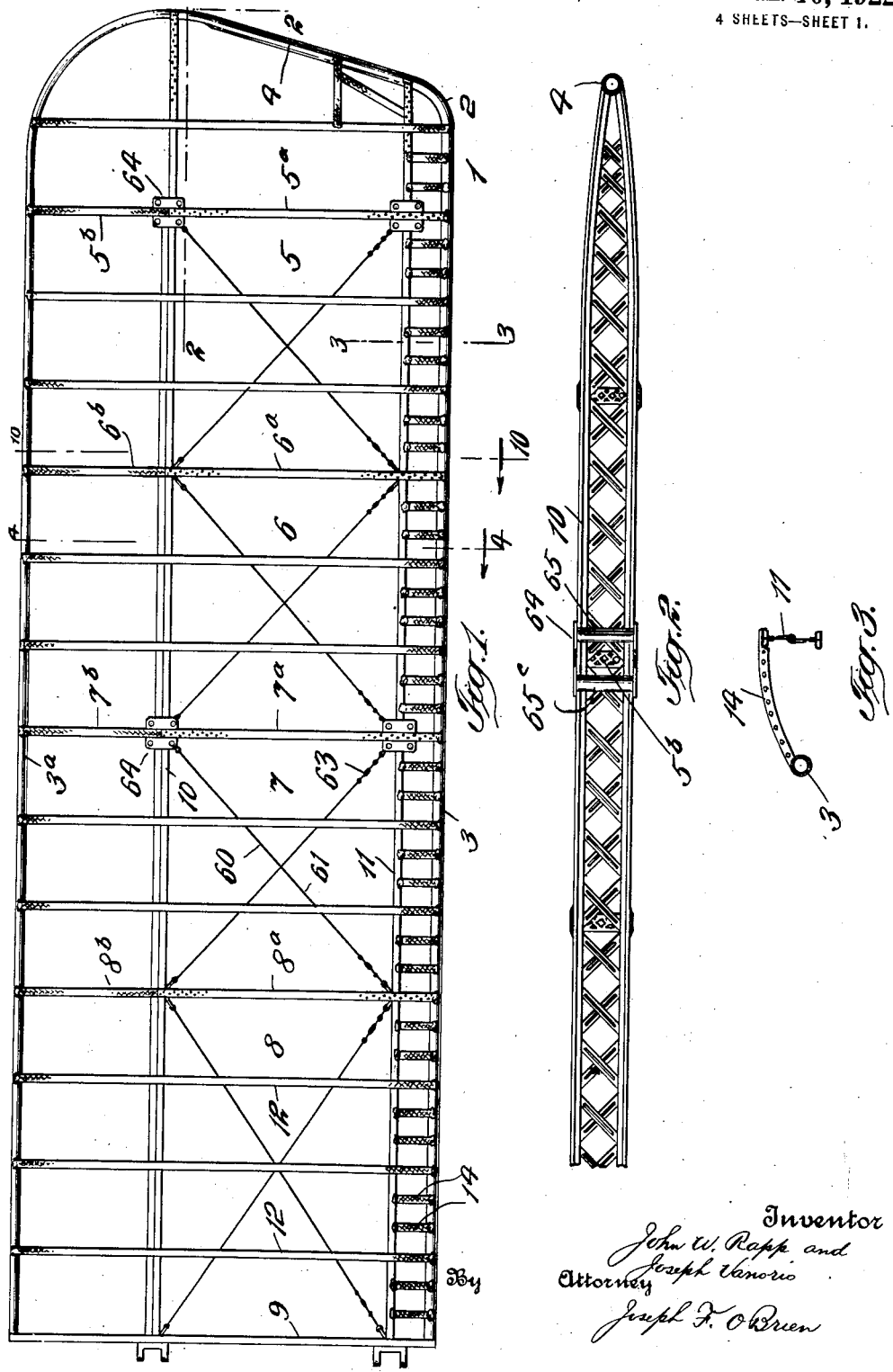

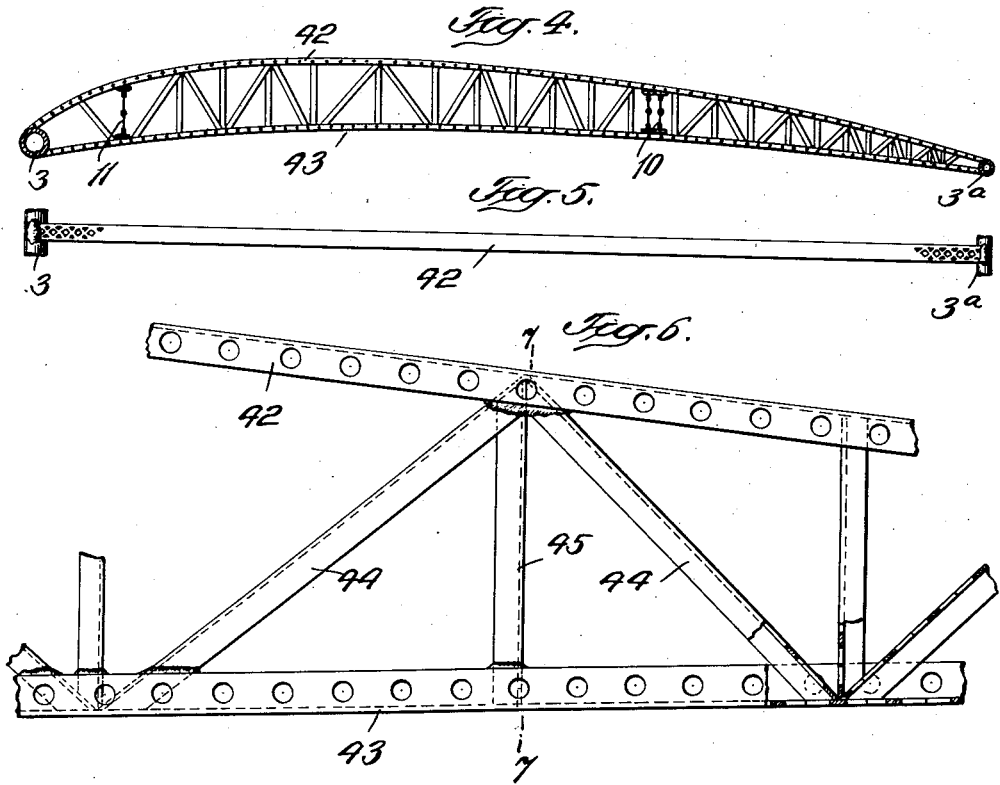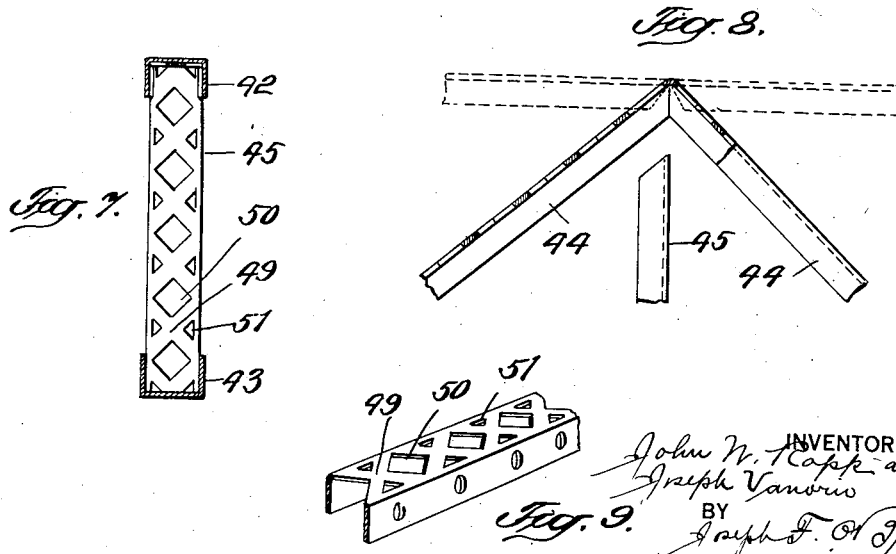

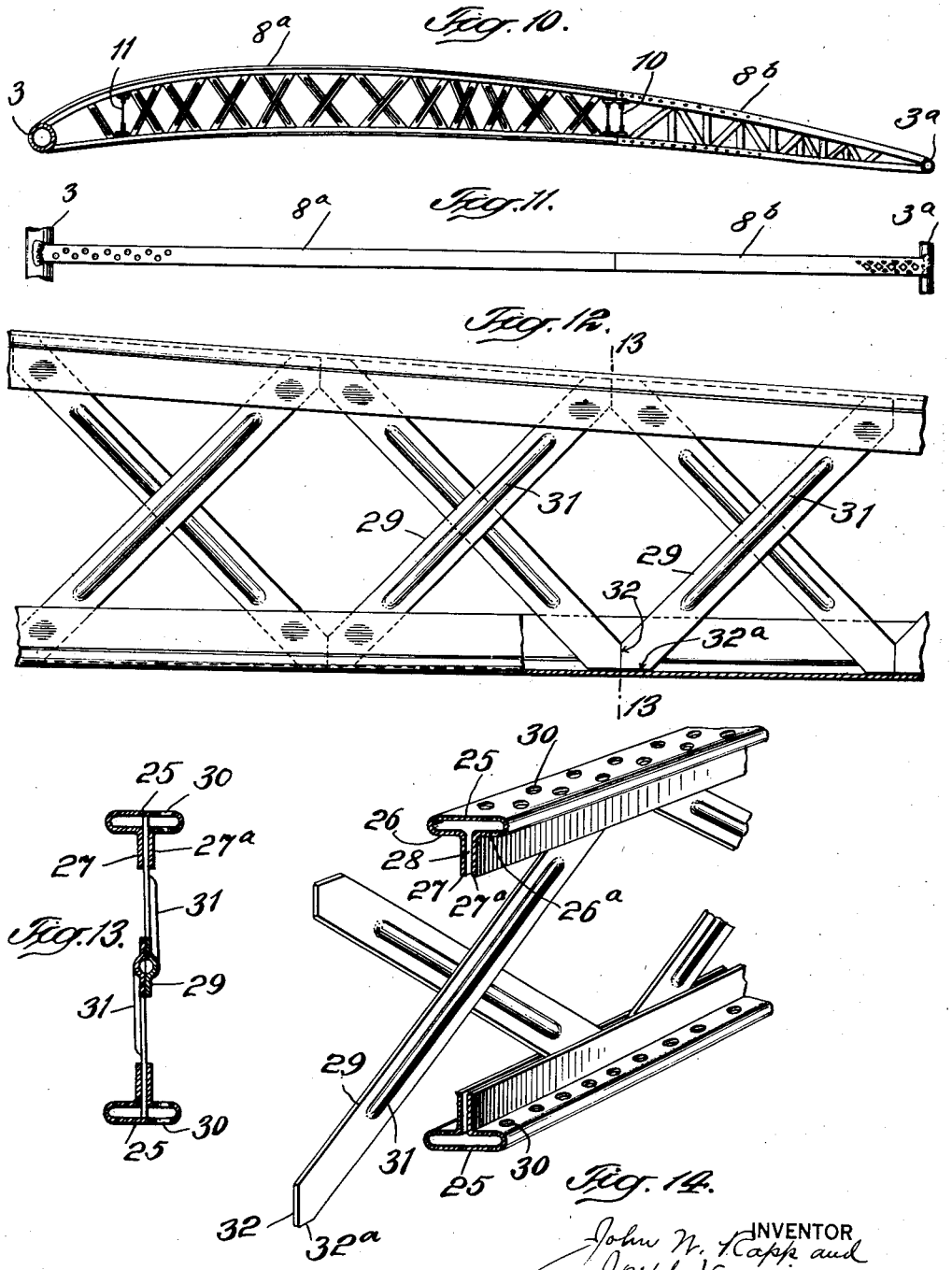

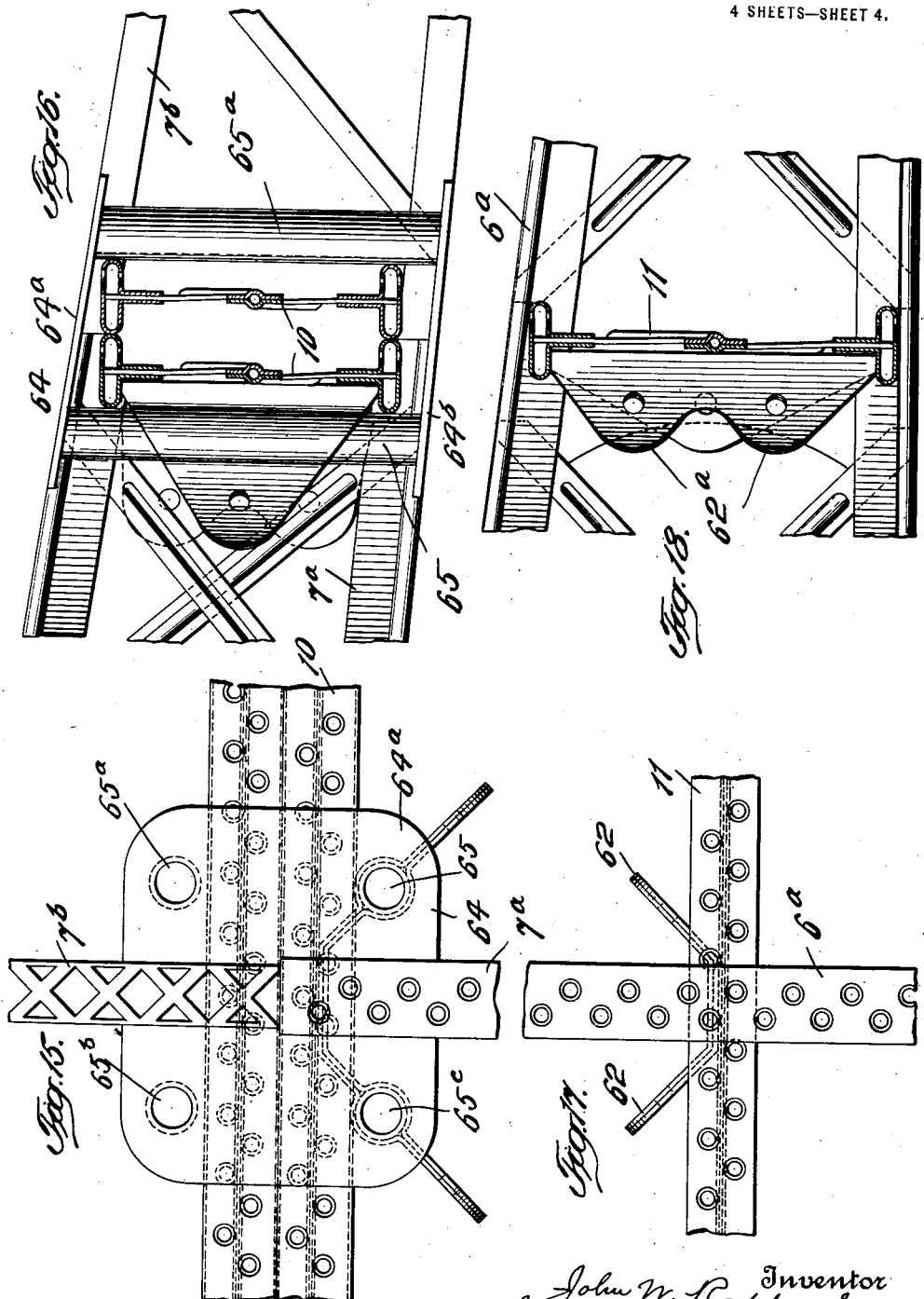

JOHN W. RAPP, OF FLUSHING, AND JOSEPH VANORIO, OF BROOKLYN, NEW YORK; SAID VANORIO ASSIGNOR TO SAID RAPP.

AIRPLANE-WING CONSTRUCTION.

1,403,444.

Specification of Letters Patent.

Patented Jan. 10, 1922.

Application filed December 31, 1917. Serial No. 209,753.

*To all whom it may concern:*

Be it known that we, JOHN W. RAPP and JOSEPH VANORIO, both citizens of the United States, and residing, respectively, at Flushing and Brooklyn, in the counties of Queens and Kings, respectively, and State of New York, have invented a new and Improved Airplane-Wing Construction, of which the following specification is a full disclosure.

This invention relates to improvements in airplane wing construction.

The primary object of this invention is to produce from sheet metal parts an airplane wing or like airplane part which will have much greater strength and rigidity for a given weight than wings heretofore employed and will be so reinforced as to withstand all strains that may be put upon it in use.

In a more intense aspect, our invention contemplates the use of a series of metallic ribs suitably arranged in and secured to frame members, each rib comprising top and bottom longitudinal members connected to each other by a series of diagonal bracing members in truss-formation, and each longitudinal member comprising a single strip of sheet metal bent to provide an outer web-body and inwardly-extending flanges, the said web-body of each rib having a portion of the metal between its longitudinal edges so cut away as to eliminate metal and consequently reduce the weight of the wing and yet to leave bracing portions in said web-body to give the same all the strength necessary, so that the strength of the completed rib and also of the wing structure will not be materially impaired. In this way, the wing construction will be formed of a series of sheet metal strips having metal cut away between the edges of such strips and the cumulative effect of so eliminating this surplus metal enables the wing to be brought within the proper weight limits while at the same time preserving the great strength and rigidity of the structure.

Another object of our invention is to so reinforce a bi-plane wing structure as to take care of extraordinary strains at those points where it is necessary so to do and to eliminate weight at those points where it is desirable to do so, and we accomplish this result by the employment of a minimum number of different parts, so that we are enabled to standardize the units and to assemble them with great rapidity. For example, we employ a relatively heavy form of rib unit to form the rectangular tension frames with spars of similar heavy material and the frames thus formed are tensioned with diagonal wires and where the spars are necessarily subjected to heavy strains we employ two of such units welded together longitudinally to procure great strength and rigidity while between the aforesaid tension frames and outside thereof for the purpose of saving weight, we employ a different and very much lighter form of rib construction.

Our invention furthermore consists of details of construction which will appear from the description hereinafter set forth and from an examination of the drawings accompanying the same.

In the accompanying drawings, in which similar reference characters designate corresponding parts throughout the several views, Fig. 1 is a plan view of an airplane wing embodying our invention;

Fig. 2 is a section on the line 2—2 of Fig. 1;

Fig. 3 is a section on the line 3—3 of Fig. 1;

Fig. 4 is a section on the line 4—4 of Fig. 1 illustrating our relatively light form of rib construction or unit;

Fig. 5 is a plan view showing the construction of the top and bottom members of the rib unit shown in Fig. 4;

Fig. 6 is an enlarged fragmentary view of the rib shown in Fig. 4;

Fig. 7 is a section on the line 7—7 of Fig. 6;

Fig. 8 is a detail showing the manner of forming the diagonal bracing members and connecting the vertical struts of the rib unit shown in Figs. 4 to 7;

Fig. 9 is a fragmentary view in perspective of the top or bottom members of the said light rib unit shown in Figs. 4 to 8;

Fig. 10 is a section on the line 10—10 of Fig. 1 illustrating our relatively heavy form of rib construction or unit employed for the spars or cross-ribs and at the fastening points for the struts leading to the companion or opposite member of a pair of bi-plane wings;

Fig. 11 is a view in plan illustrating the construction of either the top or bottom longitudinal member of the rib or unit;

Fig. 12 is an enlarged fragmentary view in side elevation of the rib construction or unit illustrated in Figs. 10 and 11;

Fig. 13 is a section on the line 13—13 of Fig. 12;

Fig. 14 is a fragmentary view in perspective of the rib construction shown in Figs. 10 to 13 inclusive;

Fig. 15 is a plan view of a corner of one of the tension frames having a combined wire and strut connection secured to the ribs and spars;

Fig. 16 is a side elevation of the device shown in Fig. 15 the spar being illustrated in section;

Fig. 17 is a plan view of an intermediate tension frame corner illustrating our preferred method of securing metallic straps for the tension wires; and Fig. 18 is a side elevation of one of such straps secured in place to a spar being shown in section.

Referring now to these drawings, (1) indicates a wing frame for airplanes or the like. Said wing illustrated in Fig. 1 comprises a marginal frame formed of round tubes having parallel sections 3—3ª terminating at the end in a curved section 4.

Within the said marginal frame we preferably form a series of tension frames substantially rectangular in cross-section composed of relatively heavy sheet metal rib units in combination with spars also formed of relatively heavy sheet metal parts. We have shown four of said frames indicated respectively by the numerals 5, 6, 7 and 8. Opposite ends of each of such frames are formed of ribs designated 5ª, 6ª, 7ª, 8ª and 9, while the spars which traverse or intersect said ribs transversely to form such frames are indicated by the numerals 10 and 11 respectively. Intermediate the relatively heavy tension frame ribs 5ª, 6ª, 7ª, 8ª and 9 and parallel thereto we provide a series of relatively light rib members 12 which are likewise intersected by the spars 10 and 11. As illustrated in Fig. 1, the spar 10 is for the major part of its length formed of two longitudinally extending parts secured together to afford the necessary rigidity.

Along the front marginal edge of our wing construction we also preferably employ intermediate the rib units and stretched between the spar 10 and the marginal frame section 3 a plurality of series of filler strips 14 which are also formed of sheet metal and are adapted to support the canvas covering at said front marginal edge and permit same to be stretched tightly thereover.

As illustrated, the relatively heavy rib units and spars are composed of rib construction illustrated in detail in Figs. 10 to 14 inclusive and more particularly described in our co-pending application Serial No. 207,832, for airplane rib construction. This construction comprises top and bottom longitudinal members 22—22ª substantially T shaped in conformation. Each of these top and bottom longitudinal members 22—22ª is formed of a single strip of sheet metal so bent as to provide a substantially flat outer central portion 25 oppositely disposed return portions 26—26ª which extend inwardly toward the center line of the strip and parallel marginal flanges 27—27ª extending at substantially right angles to the said return portions 26—26ª and forming a seat or channel 28 between the same which is adapted to receive and retain opposite ends of diagonal members 29, the opposite ends of which are spot welded or otherwise rigidly secured to the said marginal flanges 26—26ª. As illustrated, the body of the longitudinal members comprising the outer flat portion 25 and the return portions 26—26ª is provided with perforations 30 to reduce the weight of such members and to permit relatively heavy stock to be employed which will be suitable for spot welding. The said perforations are preferably as shown arranged diagonally so as to leave diagonal bracing portions of the metal between such perforations. This arrangement while materially reducing the weight of the members will not materially reduce the rigidity thereof.

The diagonal members 29 are provided as shown with an embossed reinforcing rib 31 and with bevelled ends 32—32ª so as to enable ready interchangeability of such diagonal members.

The relatively light rib construction employed by us is preferably such as described in our co-pending application, Serial No. 202,847, for airplane rib construction, and comprises, as illustrated in Figs. 4 to 9 inclusive, a metallic rib formed of top and bottom longitudinal channel members 42 and 43 respectively of similar cross-section dimensions and a series of diagonal bracing members 44, fitting within the flanges of the said top and bottom channel members 42 and 43 respectively. These diagonal members 44 also preferably comprise channel bars similar in cross-sectional dimensions and preferably arranged in pairs, each pair being formed in one piece as illustrated in Fig. 8 a section of the flanges at opposite sides being cut away to permit the downward bending of such diagonal members from the dotted line positions illustrated in said figure. A vertical strut 45 also formed of channel iron, is gauged to fit within flanges of the longitudinal members and is arranged at each abutting joint between the diagonal members 44. All of the members are securely welded together at their abutting joints. In order to procure extreme lightness of construction and at the same time to enable the employment of metal with sufficient body to enable it to be welded we employ a relatively heavy gauge metal and have eliminated from the web portions of each of the channel irons above referred to, portions of the metal thereof between what we shall term bracing portions. As shown more clearly in Figs. 7 and 9 we have cut away portions of the web so as to provide X shaped bracing portions 49 and diamond shaped openings 50 therebetween, and also triangular shaped openings 51 between the legs of the X shaped bracing portions 49.

The tension frames 5, 6, 7 and 8 are suitably tensioned with tension wires 60, 61, which are as aforesaid connected at the corners of the said frames. As illustrated in Figs. 15 to 18 inclusive, we have provided each of such corners with straps 62. These straps extend to opposite sides of the heavy rib member and permit the ready fastening thereto of the wires 60, 61, which may be tensioned by turn buckles 63 or in any other suitable manner. The tension wires 61 are preferably doubled and for this purpose we provide a double attaching flange for the said strip 62 at one side of the rib. The wing shown in the drawings is one of two superposed wings of a bi-plane, and at those crossing portions of the wing at which it is desired to connect the struts extending to the other wing we provide reinforcing blocks 64 comprising two sections disposed at opposite sides of the rib and bridging the spar, each section composed of top and bottom plates $64^a$, $64^b$, connected together by four posts 65, $65^a$, $65^b$, $65^c$, these block-sections being securely welded to the ribs and having connecting straps $62^b$ welded to the spars at said crossing portions thereof.

Having described our invention, we claim:

An airplane wing or like part embodying a metallic marginal frame, a plurality of sheet metal spars of relatively heavy construction secured to the said marginal frame, a series of rib units also formed of sheet metal parts of relatively heavy construction intersecting said spars and secured to the marginal frame members at the opposite ends thereof; a plurality of filler rib units also formed of sheet metal parts of relatively lighter construction interposed between and arranged parallel to the aforesaid relatively heavy rib units and filler strips also formed of sheet metal arranged intermediate and parallel to said light rib units and connecting the marginal frame at the front edge of said wing and one of said spars to form a canvas support at the front edge of the wing.

In witness whereof, we hereunto subscribe our names, as attested by the two subscribing witnesses.

JOHN W. RAPP.
JOSEPH VANORIO.

Witnesses:
W. C. LANGE,
JOSEPH F. O'BRIEN.